(12) United States Patent
Bailey et al.

(10) Patent No.: US 7,580,564 B2
(45) Date of Patent: Aug. 25, 2009

(54) METHOD OF AN IMAGE PROCESSOR FOR TRANSFORMING A N-BIT DATA PACKET TO A M-BIT DATA PACKET USING A LOOKUP TABLE

(75) Inventors: James Ray Bailey, Shelbyville, KY (US); Curt Paul Breswick, Georgetown, KY (US); David Allen Crutchfield, Georgetown, KY (US); Thomas Jon Eade, Lexington, KY (US); Zachary Nathan Fister, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 659 days.

(21) Appl. No.: 10/844,787

(22) Filed: May 13, 2004

(65) Prior Publication Data

US 2005/0254706 A1 Nov. 17, 2005

(51) Int. Cl.
*G06K 9/00* (2006.01)
*G06K 9/36* (2006.01)

(52) U.S. Cl. ...................................... 382/166; 382/251
(58) Field of Classification Search ................. 382/161, 382/166, 274, 167
See application file for complete search history.

(56) References Cited

U.S. PATENT DOCUMENTS

| | | | |
|---|---|---|---|
| 5,172,237 A | 12/1992 | Blonstein | |
| 5,479,587 A | 12/1995 | Campbell et al. | |
| 5,504,591 A | 4/1996 | Dujari | |
| 5,517,335 A | 5/1996 | Shu | |
| 5,596,510 A | 1/1997 | Boenke | |
| 5,623,556 A | 4/1997 | Murayama et al. | |
| 5,687,300 A | 11/1997 | Cooper | |
| 5,724,450 A | 3/1998 | Chen | |
| 5,768,481 A | 6/1998 | Chan et al. | |
| 5,930,387 A | 7/1999 | Chan et al. | |
| 5,983,251 A | 11/1999 | Martens | |
| 6,393,148 B1 | 5/2002 | Bhaskar | |
| 6,510,247 B1 | 1/2003 | Ordentlich et al. | |
| 6,580,825 B2 | 6/2003 | Bhaskar | |
| 6,665,454 B1 | 12/2003 | Silverbrook et al. | |
| 6,774,953 B2* | 8/2004 | Champion et al. | 348/651 |
| 6,828,982 B2* | 12/2004 | Lee | 345/604 |
| 2003/0016305 A1* | 1/2003 | Champion et al. | 348/649 |

* cited by examiner

*Primary Examiner*—Jingge Wu
*Assistant Examiner*—Max Shikhman
(74) *Attorney, Agent, or Firm*—Michael Best & Frederick LLP

(57) ABSTRACT

A method of transforming a n-bit data packet to a m-bit data packet with a lookup table. The lookup table includes at least one entry data packet and at least one respective delta value associated with each entry data packet. The method includes the acts of receiving an input data packet having n-bits, indexing the lookup table with at least a portion of the input data packet to obtain one of the at least one entry data packet, and decompressing the obtained entry data packet with the at least one respective delta value associated with the obtained entry data packet, thereby resulting in an output data packet having m-bits. The decompressing act includes using a portion of the input data packet to determine the number of delta values called for decompressing the obtained entry data packet. The method can be used in, for example, an image processor.

19 Claims, 4 Drawing Sheets

METHOD OF AN IMAGE PROCESSOR FOR TRANSFORMING A N-BIT DATA PACKET TO A M-BIT DATA PACKET USING A LOOKUP TABLE

BACKGROUND

The invention relates to a method of transforming data, and particularly, to a method of transforming data during a tonal transformation process.

An image scanned using an imaging device (e.g. a scanner, a multi-functional device such as a scanner-printer-facsimile machine, etc.) may have several transformations performed on it before the resultant image is either displayed (e.g., on a PC) or printed (e.g., via a printer). For example, the target image can be scanned at a bit-depth of 30 to 48 bits, and then transformed to a 24-bit image where the 24-bit image is saved and viewed on a personal computer. Alternately, the 24-bit image can be processed to a 4-bit to 9-bit image and printed on a printing device.

One common type of image transformation is known as tonal transformation. A scanned image may go through several tonal transformations to achieve the desired result. Example tonal transformations include gamma compensation, brightness/contrast adjustment, and shadow enhancement. The quality of the transformation has a direct effect on the quality of the scanned output image, making tonal transformation important to the quality of a scanner. Poor methods of transformation may cause visually detectable quantization in the scanned output image and a decreased scanner modulated transfer function (MTF) measurement. One method to reduce quantization is to input a higher bit-depth image than is output during the tonal correction (e.g. a 36-bit image becomes a 24-bit image after the tonal transformation).

One method of tonal transformation is to apply a mathematical equation to each pixel in the image. This is a common way to transform a RGB image to a sRGB image or to adjust the brightness or contrast of an image. In multi-functional devices, a transformation such as this usually takes place inside the application specific integrated circuit (ASIC) during a standalone copy. Applying multiple, complex mathematical equations to the image for such transformations may be detrimental to the performance of the copy operation and may be too inflexible to be practically implemented in an ASIC.

To maintain flexibility and performance of the ASIC, a lookup table (LUT) can be used to perform tonal transformations. In one method, the value of the pixel indexes directly into a table with the resulting output pixel being returned. What is stored in the table can be easily updated, thus allowing for flexibility. Multiple transformations can be achieved using a single LUT, and thus, further improve performance.

One problem with using a direct indexing method is the size of the LUT. For example, if a 16-bit color indexes into a table that returns an 8-bit color, a 65536×8 table is required. This would result in a 64 KB table. For a 48-bit to 24-bit tonal table (or three 16-bit to 8-bit tables, each corresponding to one of three colors (e.g., red, green, and blue)), the table requires a 192 KB RAM, which is costly to implement in hardware. Placing the table in main memory and using direct memory access (DMA) to access the table places a significant burden on memory resources, which may affect the performance of the ASIC. It would be beneficial to have an alternative method of performing tonal transformation.

SUMMARY

In one embodiment, the invention provides a method of transforming a n-bit data packet to a m-bit data packet with a lookup (LUT) table. The LUT table includes at least one entry data packet and at least one respective delta value associated with each entry data packet. The method includes the acts of receiving an input data packet having n-bits, indexing the LUT table with at least a portion of the input data packet to obtain one of the at least one entry data packet, and decompressing the obtained entry data packet with the at least one respective delta value associated with the obtained entry data packet, thereby resulting in an output data packet having m-bits. The decompressing act includes using a portion of the input data packet to determine the number of delta values called for decompressing the obtained entry data packet. The method can be used in, for example, an image processor.

In another embodiment, the invention provides an image processor for transforming a n-bit image data packet to a m-bit data packet. The image processor includes a memory having one or more LUT tables. The one or more LUT tables include z entry values and $c=(2^n)/z-1$ respective delta values associated with each entry value. The c respective delta values are represented by $\Delta(1) \ldots \Delta(c)$. The image processor includes a processor configured to transform a binary input value represented by input value (n−1:0) to a binary output value represented by output value (m−1:0). The processor indexes the LUT table with the bits input value (n−1:n−k) to obtain an associated entry value represented by entry value [x], where k is equal to $k=\text{ceiling}(\log_2(z))$. The processor includes a decompressor configured to decompress the entry value [x] to obtain the output value (m−1:0). The decompression uses the equation $$\text{output value}(m-1:0) = \text{entry value}[x] + \sum_{i=1}^{y} \Delta(i)$$

where y represents $\text{base}_{10}$ [input value (n−k−1:0)].

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
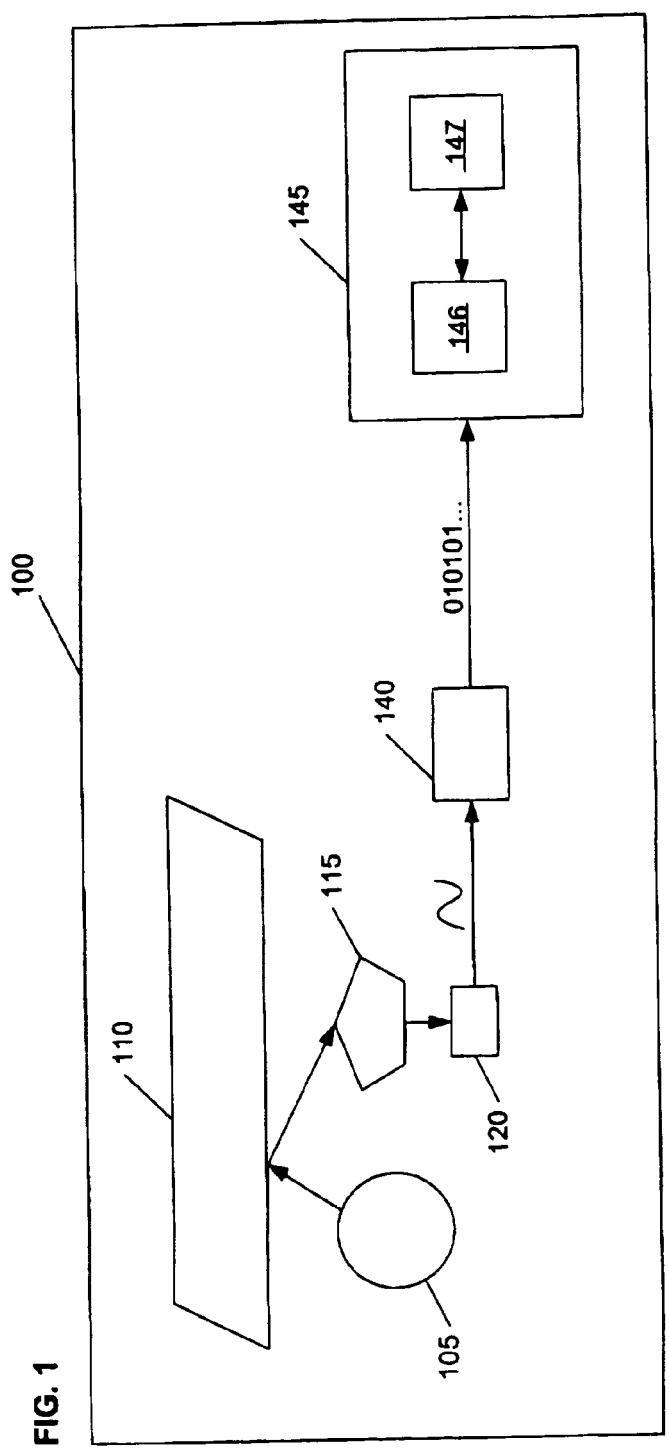
FIG. 1 is a schematic diagram representing a scanner incorporating the invention.

FIG. 1 schematically represents an optical reduction scanner 100 incorporating the invention. While the invention will be described in connection with the scanner 100, the invention is not limited to the scanner 100. The invention can be used with other apparatus (e.g., a multi-function device, a digital camera, etc.) requiring data transformation (or compression), particularly devices that require tonal transformations. It is also envisioned that the invention can be implemented in software or customized hardware, and therefore, be executed by any appropriate electronic device (e.g., a microprocessor, a microcontroller, etc.) where the device performs data transformation. For example, the invention can be implement in software executable by a personal computer.

Figure 2:
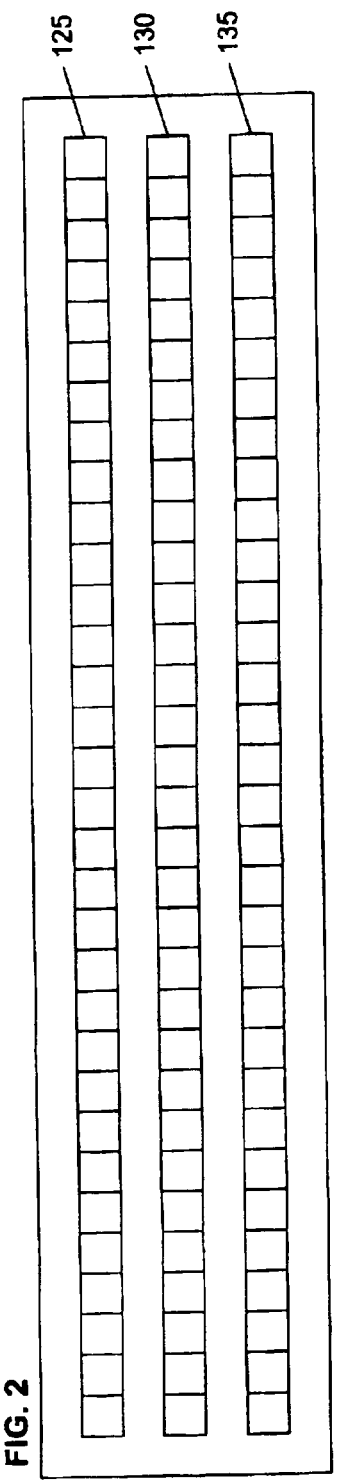
FIG. 2 is a schematic diagram representing an image sensor used in the scanner of FIG. 1.

With reference to FIG. 1, the scanner 100 includes a white light source 105 (e.g., a fluorescent bulb) that is used to illuminate a line of the target image 110 held by the scanner 100. This type of light source 105 contains red, green, and blue wavelengths of light. The light reflects off of the target image 110 and is directed through a series of optical elements 115. The optical elements 115 shrink the image down to the size of the image sensor 120. The image sensor 120 typically contains three rows of elements 125, 130, and 135 (shown in FIG. 2). Each row 125, 130, and 135 has a filter to detect a specific color. For example, FIG. 2 shows a CCD image sensor having red, green, and blue line sensors 125, 130, and 135, respectively. Other line sensors are possible.

Each line sensor 125, 130, and 135 charges to a voltage level corresponding to the intensity of the color detected for that element. The voltage for each element of the captured line is then shifted out of the image sensor serially and sent to an analog front-end device 140 (FIG. 1), which contains an analog-to-digital (A/D) converter. The analog voltage level is converted to a digital value and sent to the digital controller application-specific-integrated-circuit (ASIC) 145. The exemplary ASIC 145 shown in FIG. 1 conceptually includes a processor 146 and a memory 147. The ASIC 145 processes the digital values and sends the processed information to a host PC for a scan-to-host operation or to a printer for a standalone copy operation. For example, the ASIC may receive 36-bit image data from the front-end device 140 and processes this data to a 24-bit image.

Before proceeding further, it should be noted that the scanner 100 includes other components not shown or described herein. For example, the scanner 100 includes a scanner motor to move the light source 105, optics 115, and sensor 120 across the target image. It should also be noted that the scanner discussed in FIG. 1 is an optical reduction scanner. However, other scanner types (e.g., contact image sensor scanners) can incorporate the invention. Also, the elements and arrangement of the elements shown in FIG. 1 provide an example optical reduction scanner. Other constructions of the optical reduction scanner are possible (e.g., the optical reduction scanner can be microprocessor based rather than ASIC based.).

Typically, the scanner 100 performs the data transformation during a tonal transformation process, examples of which are discussed below. However, the invention can be used in other applications that require data transformation (or compression) and is not limited to tonal transformation processes.

Discussed below are three Example tonal transformation processes. Example 1 provides an example of a tonal transformation of the prior art. Examples 2 and 3 provide examples of tonal transformations incorporating the invention. Examples 1 and 2 are described in connection with a 36-bit to 24-bit tonal transformations. However, as will become apparent in Example 3, the invention is not limited to 36-bit to 24-bit tonal transformations and the invention can be applied to other data transformation applications.

EXAMPLE 1

Figure 3:
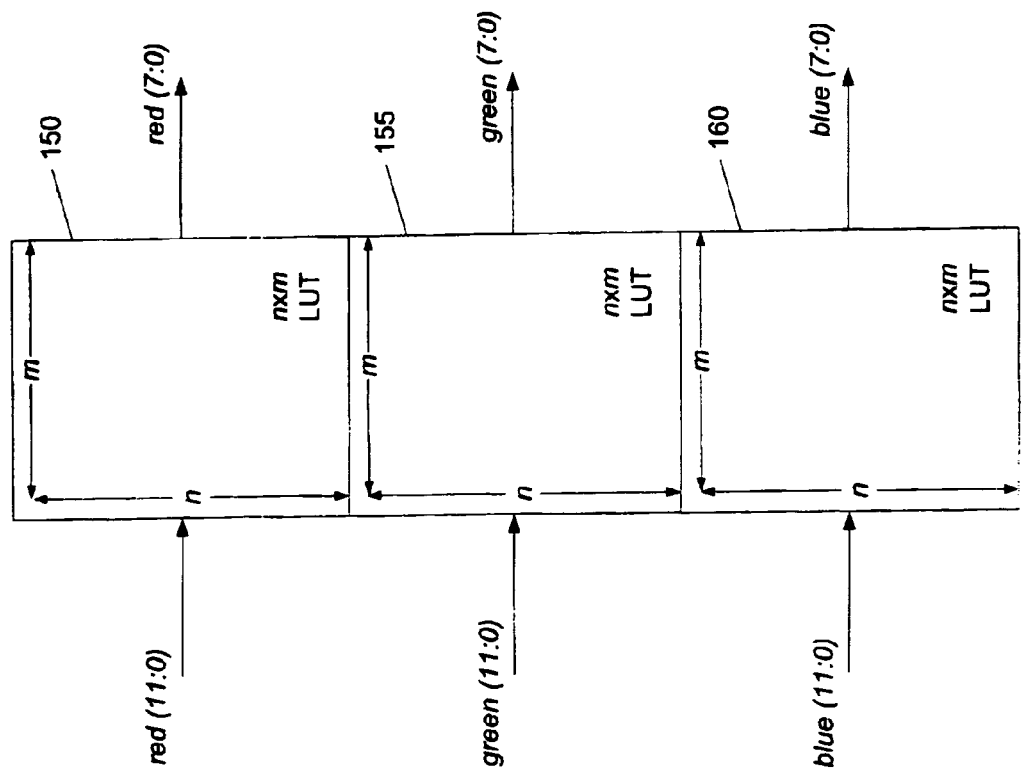
FIG. 3 is a schematic diagram representing three lookup tables used in a 36-bit to 24-bit tonal transformation.

Three 12-bit to 8-bit tonal transformation tables 150, 155, and 160 of the prior art are schematically represented in FIG. 3. The tables are stored in memory (e.g., SRAM) of the ASIC. Table 150 performs a red element tonal transformation, table 155 performs a green element tonal transformation, and table 160 performs a blue element tonal transformation. The discussion herein will focus on the red table 150. The table 150 requires $2^n*m$ storage elements, where n equals the number of input bits (i.e., twelve for table 150) and m equals the number of output bits (i.e., eight for table 150). An input data packet (or input value) represented by input value (n−1:0) (i.e., red (11:0) for table 150) is applied to the table. As a result of the application, the m-bit data packet (i.e., red (7:0) for table 150) corresponding to input value (n−1:0) results.

For the construction shown, n is equal to twelve and m is equal to eight, resulting in 32,768 storage elements, or 4 KB worth of SRAM. Thus, a 12 KB SRAM is used to store the three tables 150, 155, and 160. The tables 150, 155, and 160 provide a flexible, high performance means for tonal transformation and are used to intelligently truncate 36-bit scan data to 24-bit scan data while minimizing quantization errors. However, the tables 150, 155, and 160 require approximately 0.5 mm$^2$ worth of die area to implement in a typical 0.13 µm cmos process.

EXAMPLE 2

Figure 4:
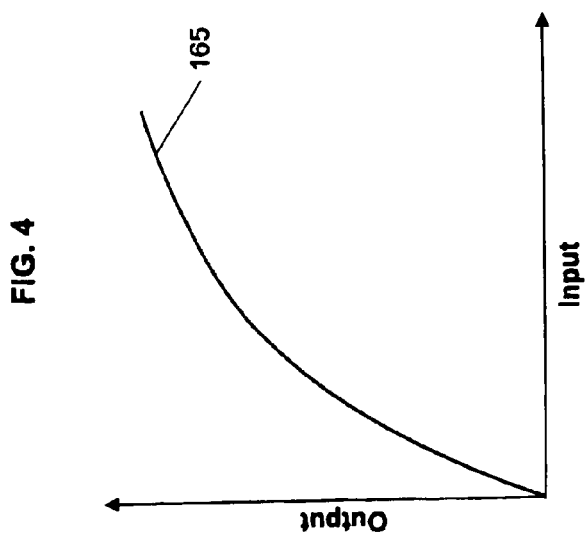
FIG. 4 is a graph representing the typical shape of a gamma curve.

One type of tonal transformation used in scanning is gamma compensation. An example of a typical gamma curve 165 is shown in FIG. 4. It may be beneficial to allow the curve 165 to somewhat change its shape for each color to compensate for the imperfections in the color response of the scanner 100. However, the typical shape of the curve 165 exhibits specific characteristics, which can be used to optimize tonal transformations. First, the output of the gamma curve 165 always increases or stays the same as the input increases. That is, the output never decreases as the input increases. Second, when the gamma curve 165 is applied to higher bit-depth input than is the output, the difference between neighboring output entries in the table will typically differ by +0 or +1.

Figure 5:
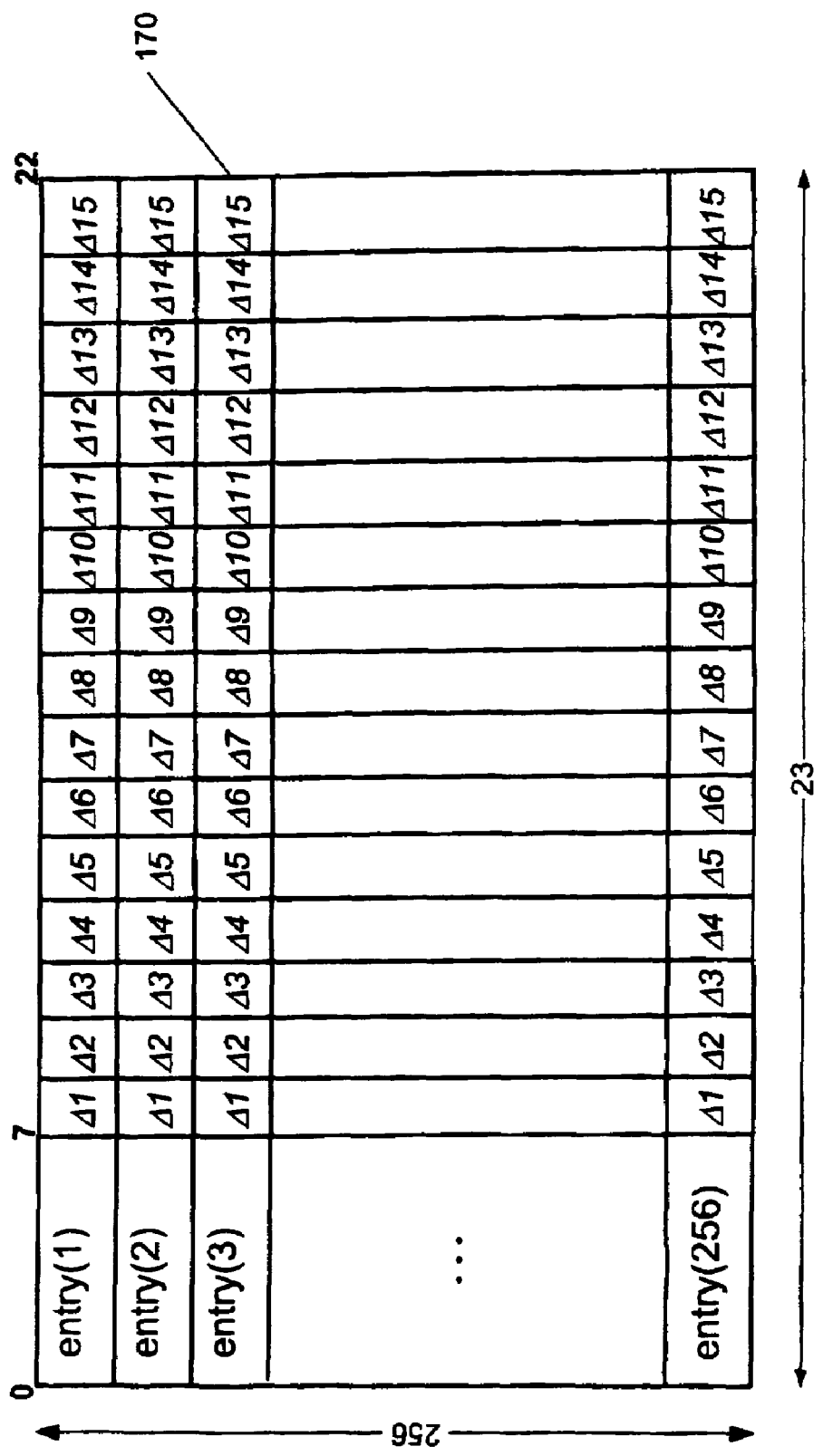
FIG. 5 represents a 256 entry lookup table having 15 delta values.

In one embodiment of the invention, the above two characteristics of the tonal transformation data are used to compress the lookup table to a much smaller tonal transformation table. Specifically, a sparsely populated table (as compared to Example 1) and the associated delta values between entries are stored in one or more tables. An example of a table 170 used for performing a red element transformation is shown in FIG. 5. Tables used for performing green and blue element transformations might be similar to table 170. For table 170, one of every sixteen output values (referred to herein as entry values or entry data packets) are contained within the table 170, and fifteen delta values are associated with each entry value. For the table 170, each delta value is one bit since the difference between neighboring output pixels is typically +0 or +1. Accordingly, each address in table 170 contains an 8-bit entry value plus fifteen 1-bit delta values. Thus, table 170 results in a 256×23 element table.

To use the table 170, the upper eight bits of the 12-bit input entry (represented by red (11:4)) are used to index into the table 170. What is returned is an 8-bit value plus fifteen delta entries (represented by compressed red entry (22:0)). The lower four bits of the 12-bit input pixel (represented by red (3:0)) are then used to select how many delta values are added to the returned 8-bit entry value. For example, if the input value is Red (100000000101), then the entry value at address 10000000 is returned from table 170 along with the associated fifteen delta values. Using the lowest four bits of the input value, 0101, it is determined that the first five delta values are added to the returned entry value. If the entry returned was $75_{base\ 10}$ and $\Delta 1=0$, $\Delta 2=1$, $\Delta 3=0$, $\Delta 4=0$, and $\Delta 5=1$, then the resulting pixel is $77_{base10}$. In general, the output is based on the equation:

$$\text{output value}(m-1:0) = \text{entry}[x] + \sum_{n=1}^{y} \Delta(n) \qquad [\text{e1}]$$

where x=input pixel(11:4) and y=input pixel(3:0).

Figure 6:
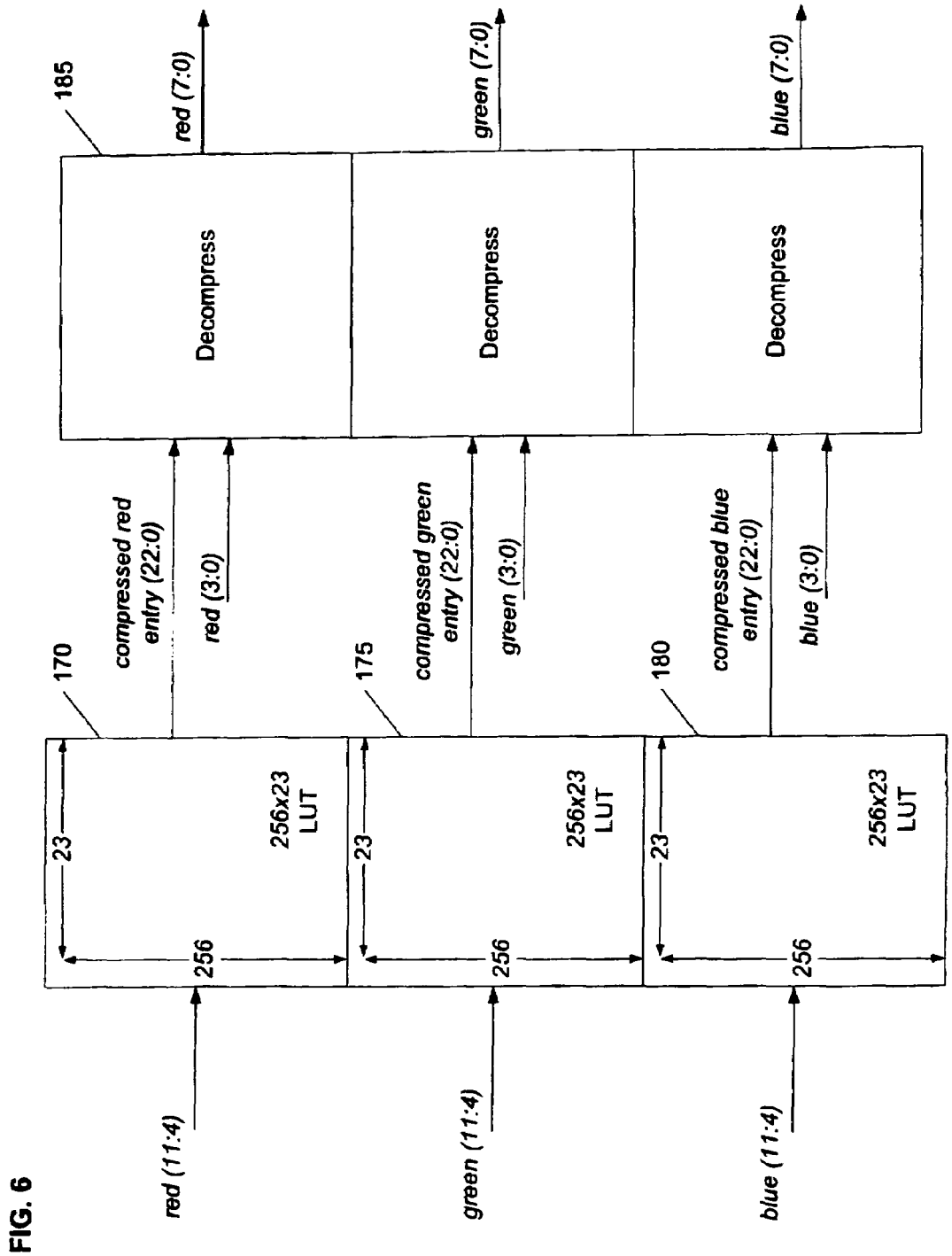
FIG. 6 is a schematic diagram representing three compressed lookup tables and three decompressors used in a 36-bit to 24-bit tonal transformation.

FIG. 6 schematically represents how the tonal transformation operation works for a 12-bit conversion to 8-bit conversion with 256 entry values. Each table 170, 175, and 180 represents a color transformation and includes 5888 elements. For this particular implementation, the size of the table 170 is reduced from 4 KB in Example 1 to 0.72 KB SRAM in Example 2, an 82% reduction in size. The estimated die area for the three tables 170, 175, and 180 for SRAM based tables is approximately 0.15 mm² in a 0.13 μm process, a 66% reduction in size from the original non-compressed tonal tables.

The discussion herein will focus on the red table 170. The ASIC receives an input value represented by input value (11:0). The first 8 bits input value (11:4) are used to index table 170. As a result of the application, the ASIC receives entry value [x] and the delta values $\Delta 1 \ldots \Delta 15$. The compressed red entry (22:0) and input value (3:0) are then applied to the decompressor 185. Using equation [e1], the decompressor 185 modifies the entry value with the appropriate delta values, resulting in output value (7:0).

EXAMPLE 3

As discussed above, Example 2 implements a 265×23 table. However, the described transformation technique can be generically applied. Additionally, for Example 2, the delta values were limited to +0 or +1. However, if a delta value greater than +1 or less than +0 were expected, then the bit width for each delta value would increase accordingly. For example, if values of +1, 0, and −1 are expected, then 2-bit delta values can be used, where the first bit is a sign bit and the second bit is a value bit. Other variations are possible.

If n equals the number of input bits and m equals the number of output bits, then a fully populated table (e.g., as shown in Example 1) requires $2^n * m$ storage bits. For a compressed tonal table using the technique described herein, the corresponding table will have the following number of storage bits:

$$\text{number of storage bits} = z * \left( \left( \frac{2^n}{z} - 1 \right) * b + m \right) \qquad [\text{e2}]$$

where z equals the number of table entries, and b equals the number of bits in each delta value.

Referring to example 2, the number of table entries was 256, the number of bits in each delta value was 1, the number of input bits was 12 and the number of output bits was 8. Substituting into equation [e2]

$$\text{number of storage bits} = 256 * \left( \left( \frac{2^{12}}{256} - 1 \right) * 1 + 8 \right) = 5888 \qquad [\text{e3}]$$

The number of table entries defines how sparsely populated the table is. A least sparsely populated table would contain a single entry plus a series of delta values that correspond to the remaining entries. However, this would require an addition operation for each delta entry to decompress the table in hardware. In the implementation of Example 2, a 256-entry table was selected with fifteen delta values corresponding to the values between entries. This translates to a maximum of fifteen addition operations to decompress the corresponding tonal value from the table. A more sparsely populated table would result in a smaller table, and thus more addition operations would be required to compute the decompressed output value.

The input address into the compressed table is based on the number of table entries. The upper k bits of the input pixel will correspond to the input address into the table where $$k = \text{ceiling}(\log_2(z)) \qquad [\text{e4}]$$

Referring to example 2, z was 256. Substituting into equation [e4], $$k = \text{ceiling}(\log_2(256)) = 8 \qquad [\text{e5}]$$

The lower n−k bits of the input pixel are used to determine how many delta values are added to the returned entry. Referring to example 2, n−k equals 4 bits. This identifies that the lower four-bits of the input pixel are used to determine how many deltas to add to the entry value to obtain the output value for the corresponding input value.

The compression technique of Examples 2 and 3 is lossless as long as the programmed table follows the two assumptions below. The first assumption is the output always increases or stays the same as the input increases. That is, the output never decreases as the input increases. Second, when applying the transformation technique, the difference between neighboring output entries in the table differs by a known value. The result is a compression technique that reduces the data size required for a tonal transformation (e.g., an eighty-two percent reduction was shown from Example 1 to Example 2). This savings could be realized in the amount of die area consumed by a transformation table within the ASIC or it could be realized in the amount of disk space required by the PC to store all of the possible transformation tables required by a product.

While Examples 2 and 3 were described as obtaining the entry value and all associated delta values, it is envisioned that other variations are possible. For example, it is envisioned that the ASIC analyzes input value (n−k−1:0) prior to decompression and only obtains the appropriate delta values. More specifically and with reference to table 170, the ASIC can look at the first 8 bits to index the appropriate entry value and uses the last four bits to obtain the appropriate delta values. The decompressor can then decompress the resulting information. It is also envisioned that each lookup table can be divided across multiple tables.

Thus, the invention provides, among other things, a new and useful method of transforming a n-bit data packet to a m-bit data packet using a lookup table. Various features and advantages of the invention are set forth in the following claims.

What is claimed is:

1. A method of transforming a n-bit data packet to a m-bit data packet with a lookup table, the lookup table comprising at least one entry data packet and at least one respective delta value associated with each entry data packet, the method comprising the acts of:
   receiving an input data packet comprising n-bits,
   indexing the lookup table with at least a portion of the input data packet to obtain one of the at least one entry data packet; and
   decompressing the obtained entry data packet with the at least one respective delta value associated with the obtained entry data packet, the decompressing act comprising using a portion of the input data packet to determine the number of delta values needed for decompressing the obtained entry data packet, the decompressing act resulting in an output data packet comprising m-bits,
   wherein the input data packet is represented by input value (n−1:0), wherein the indexing act comprises the act of indexing the lookup table with the bits input value (n−1:q) to obtain one of the at least one entry data packet, and wherein the using act comprises using the bits input value (q−1:0) to determine the number of delta values called for decompressing the obtained entry data packet,
   wherein the number of entry data packets of the lookup table is represented by z, and wherein q is represented by q=n−k, where k is represented by k=ceiling($\log_2(z)$), and
   wherein the number of respective delta values associated with each entry data packet of the lookup table is represented by c where c is represented by $c=(2^n)/z-1$.

2. A method as set forth in claim 1 wherein the obtained entry data packet is represented by entry value [x], wherein the at least one respective delta value associated with each entry data packet is represented by $\Delta(1) \ldots \Delta(c)$, wherein decompressing the obtained entry data packet with the at least one respective delta value associated with the obtained entry data packet further comprises decompressing the entry value [x] to obtain the output data packet represented by output value (m−1:0), the decompressing act using the equation $$\text{output value}(m-1:0) = \text{entry value}[x] + \sum_{i=1}^{y} \Delta(i)$$

where y represents $\text{base}_{10}$ [input value ((n−k−1):0)].

3. A method as set forth in claim 1 wherein the lookup table comprises a single table comprising the z entry data packets and c respective delta values associated with each entry data packet.

4. A method as set forth in claim 3 and further comprising the act of indexing the lookup table to obtain all of the delta values associated with the obtained entry data packet.

5. A method as set forth in claim 4 wherein the indexing acts occur concurrently.

6. A method as set forth in claim 1 wherein the lookup table comprises a plurality of tables comprising the z entry data packets and c respective delta values associated with each entry data packet.

7. A method of transforming data from n-bits to m-bits with a lookup table, the lookup table comprising at least one entry value and at least one respective delta value associated with each entry value, the number of entry values being represented by z, the number of respective delta values associated with each entry value being represented by $c=(2^n)/z-1$, and the at least one respective delta value associated with each entry value being represented by $\Delta(1) \ldots \Delta(c)$, the method comprising the acts of:
   receiving a binary input value represented by input value (n−1:0),
   indexing the lookup table with the bits input value (n−1:n−k) to obtain an associated entry value represented by entry value [x], where k is equal to k=ceiling($\log_2(z)$);
   decompressing the entry value [x] to obtain a binary output value represented by output value (m−1:0), the decompressing act using the equation $$\text{output value}(m-1:0) = \text{entry value}[x] + \sum_{i=1}^{y} \Delta(i)$$

where y represents $\text{base}_{10}$ [input value (n−k−1:0)].

8. A method as set forth in claim 7 and further comprising the act of indexing the lookup table to obtain one or more of the at least one respective delta value associated with entry value [x].

9. A method as set forth in claim 7 and further comprising the act of indexing the lookup table to obtain all of the delta values associated with entry value [x].

10. A method as set forth in claim 9 wherein the indexing acts occur concurrently.

11. A method as set forth in claim 7 wherein the lookup table comprises a single table comprising the z entry values and c respective delta values associated with each entry value.

12. A method as set forth in claim 7 wherein the lookup table comprises a plurality of tables comprising the z entry values and c respective delta values associated with each entry value.

13. An image processor for transforming a n-bit image data packet to a m-bit data packet, the image processor comprising:
   a memory comprising a lookup table comprising
     z entry values, and
     $c=(2^n)/z-1$ respective delta values associated with each entry value, the c respective delta values being represented by $\Delta(1) \ldots \Delta(c)$;and
   a processor configured to transform a binary input value represented by input value (n−1:0) to a binary output value represented by output value (m−1:0), the processor being further configured to index the lookup table with the bits input value (n−1:n−k) to obtain an associated entry value represented by entry value [x], where k is equal to k=ceiling($\log_2(z)$), and the processor comprising a decompressor configured to decompress the entry value [x] to obtain the output value (m−1:0), the decompression using the equation $$\text{output value}(m-1:0) = \text{entry value}[x] + \sum_{i=1}^{y} \Delta(i)$$

where y represents $\text{base}_{10}[\text{input value }((n-k-1):0)]$.

14. An image processor as set forth in claim 13 wherein the image processor is implemented via an application specific integrated circuit.

15. An image processor as set forth in claim 13 wherein the lookup table is a single lookup table.

16. An image processor as set forth in claim 13 wherein the processor is further configured to index the lookup table to obtain a delta value associated with entry value [x].

17. An image processor as set forth in claim 16 wherein the processor indexes the lookup table for the entry value [x] and the delta value associated with entry value [x] concurrently.

18. An image processor as set forth in claim 13 wherein the processor is further configured to index the lookup table to obtain the c delta values associated with entry value [x].

19. An image processor as set forth in claim 18 wherein the processor indexes the lookup table for the entry value [x] and the delta value associated with entry value [x] concurrently.

\* \* \* \* \*